June 4, 1963 K. R. HARTMAN ETAL 3,092,160
APPARATUS FOR ORIENTING AND HALVING STRAWBERRIES
Filed June 24, 1955 3 Sheets-Sheet 2
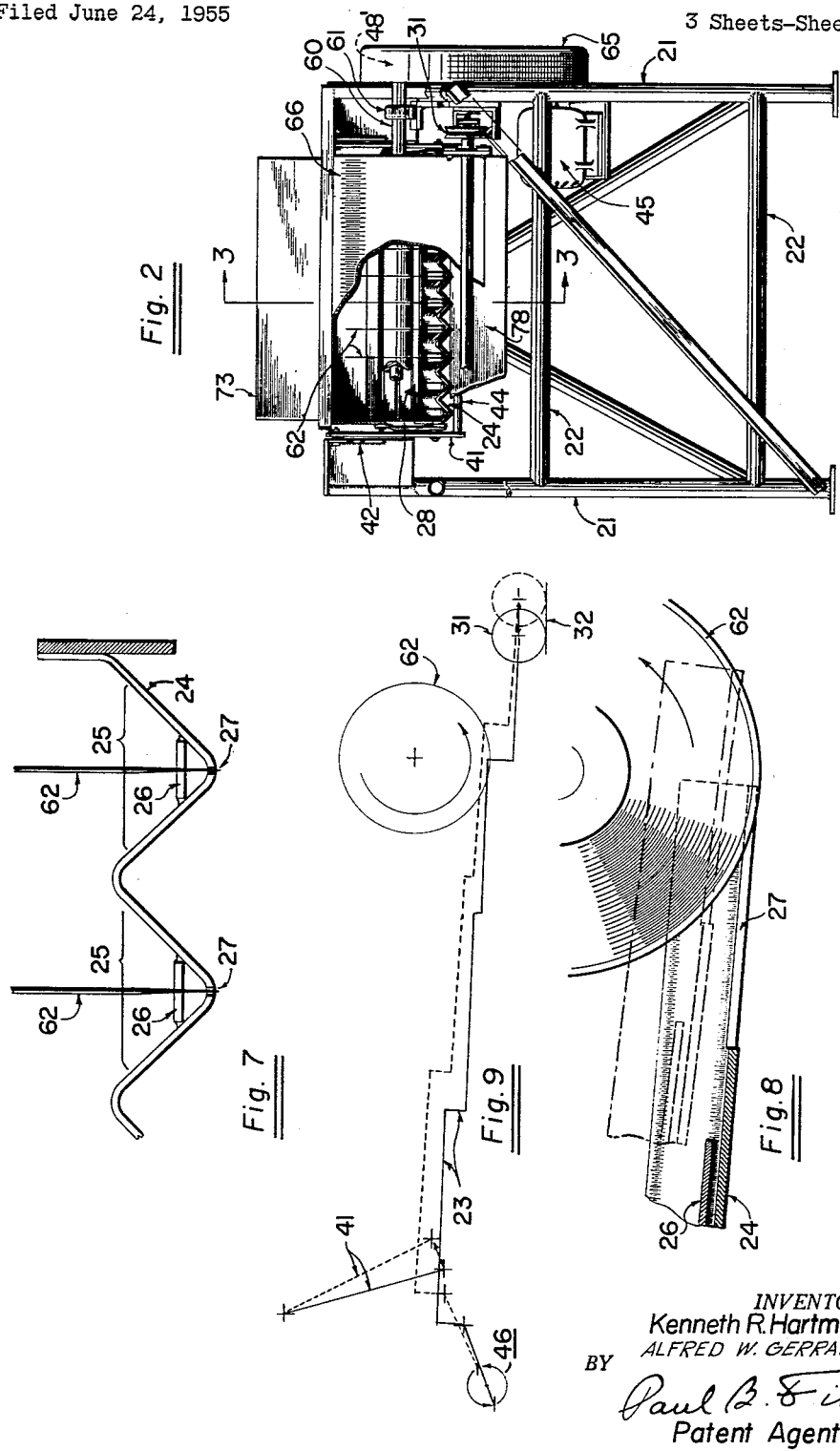
INVENTOR.
Kenneth R. Hartman &
ALFRED W. GERRANS
BY
Paul B. Fihe
Patent Agent

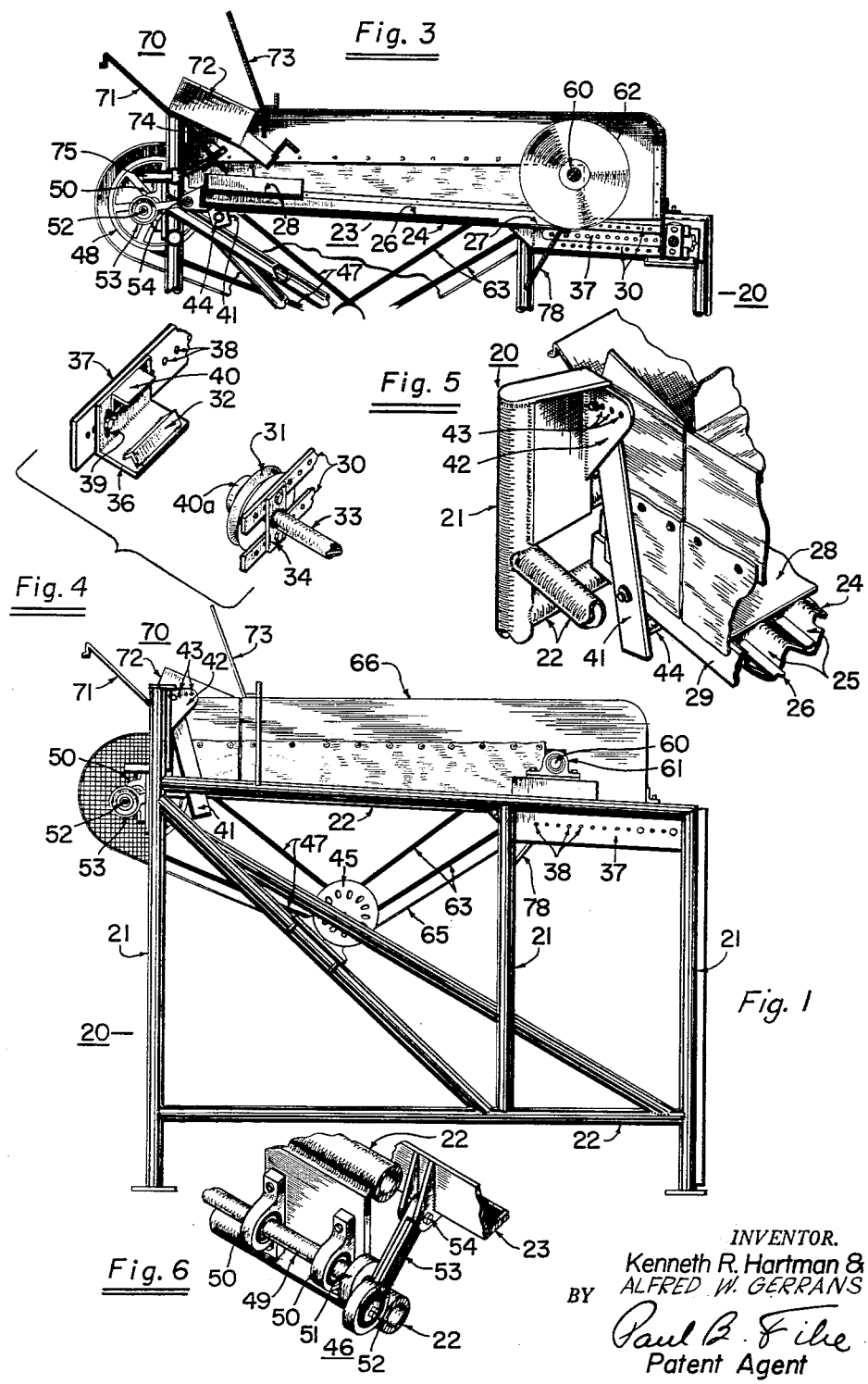

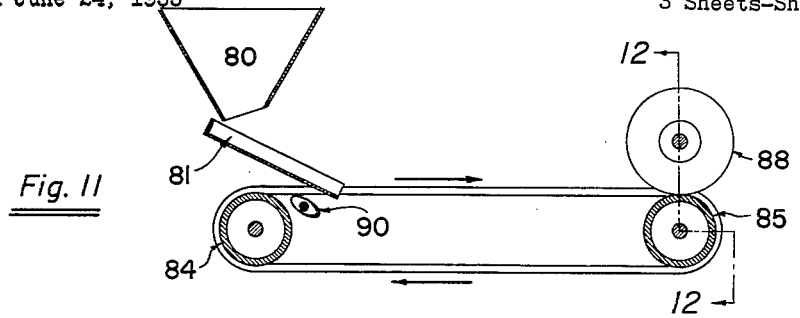
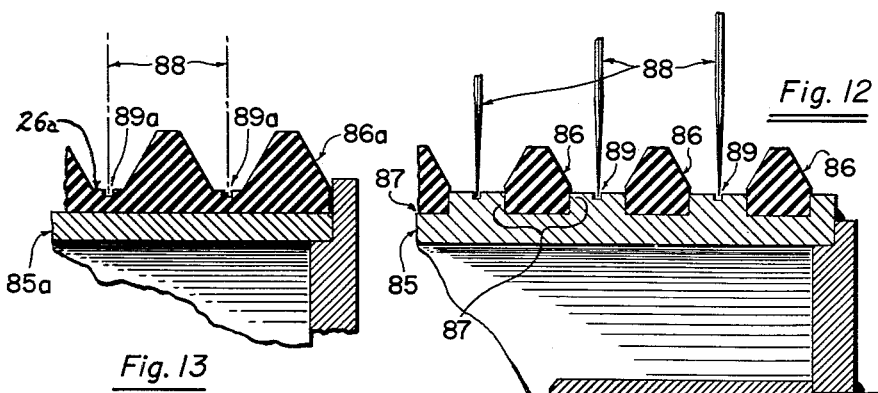
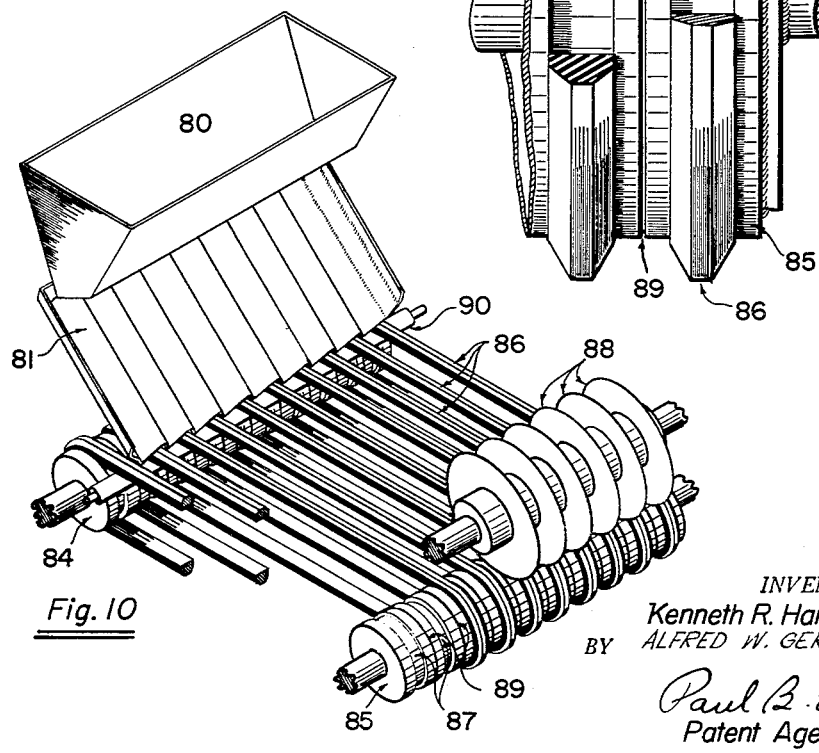

3,092,160
APPARATUS FOR ORIENTING AND HALVING
STRAWBERRIES
Kenneth R. Hartman and Alfred W. Gerrans, Saratoga, Calif.; said Gerrans assignor to said Hartman
Filed June 24, 1955, Ser. No. 517,778
5 Claims. (Cl. 146—73)

The present invention relates to food handling and processing, and more particularly to methods of and apparatus for orienting and halving fruits, vegetables and the like.

The present invention is generally directed to the solution of certain problems that are encountered in the processing of many fruits and vegetables because of their non-uniform configuration. As a result, for example, of the slight changes in shape and size between individual olives of a given variety, difficulties are encountered in properly orienting and presenting this fruit for pitting, canning, and other operations. Other fruits and vegetables, for example, strawberries, are yet more difficult to handle and process for in addition to changes in shape and size similar to those encountered with olives, pronounced asymmetries are found.

Accordingly, it is a general object of the present invention to provide an improved method of and apparatus for handling and processing fruits and vegetables including those of asymmetrical or otherwise non-uniform shapes.

A feature of the invention constitutes a method for orienting uniform or non-uniform fruits or vegetables with both rapidity and accuracy.

More particularly, it is a feature of the invention to provide a method for orienting and halving fruits or vegetables in large quantities.

Another feature relates to the method for handling and processing fruits and vegetables in a rapid albeit gentle manner whereby bruising of the handled articles is avoided.

A further feature relates to the provision of simple but effective apparatuses for carrying out the method expeditiously.

Generally, the method of orienting and of halving fruits or vegetables in accordance with the present invention is predicated upon certain inherent and relatively consistent characteristics of the particular fruit or vegetable. For example, while pears vary considerably in shape and size there yet remains a generally consistent "pear shape" as is well known. Similarly, beets, strawberries and other fruits and vegetables, while demonstrating individual variances, do have consistent generalized shapes. For purposes of explanation, further consideration will be directed specifically to strawberries with which the present invention is particularly concerned, but it will be appreciated that apt generalizations will readily occur to those skilled in the art of handling and processing fruit and vegetables wherefore the applicability of the methods and apparatuses hereinafter described to fruits and vegetables other than strawberries will be clearly recognized.

Strawberries vary considerably in size and to a lesser degree in shape. Thus, a section taken centrally through a strawberry and including its stem axis will appear generally heart-shaped, but the length of the fruit along its stem axis and its width along a central line extending perpendicularly to the stem axis and transversely through the fruit are variable. However, in almost every instance, the stem axis is longer than the central transverse line, as described, and this inherent characteristic of strawberries will be immediately recognized as generally true also for olives, pears and numerous other fruits and vegetables.

In accordance with the present invention, a support is provided such that when the strawberries are placed thereon, each berry tends, under the action of gravitational force, to assume the lowest possible position, and this position, as a result of the inherent characteristics of the berries, as described hereinabove, and the configuration of the support, is one such that the mentioned stem axis lies in a predetermined plane. More particularly the support includes opposing surfaces which decline inwardly toward one another wherefore each berry placed thereon tends to a position with its stem axis lying in a predetermined vertical plane. Preferably, the declination of the surfaces of the support is at an angle of approximately 45° but somewhat greater or lesser angles of declination can be utilized.

The general method of orienting the fruit accordingly entails the provision of a support of the character described, placing the fruit on the support, and finally causing each fruit to vibrate so as to bring the same to the described lowest position with its stem axis in a vertical plane. Such vibration is essential in that although the tendency to assume the described position is present, such position will assuredly be attained only as a result of the vibratory action. Appropriately, the vibration of the fruit is achieved by imparting vibratory movement to the support itself.

In accordance with an additional aspect of the present invention, the strawberries which are oriented by the abovedescribed method are then moved to a processing station where each oriented berry is acted upon in a desired manner. To enable such movement, the declining surfaces of the described support constitute the sides of an elongated trough whose cross-sectional configuration is consequently substantially V-shaped. Movement is imparted to the berries either by longitudinal movement of the trough support or by tilting said trough whereupon the aforedescribed vibration will cause the berries to move therealong in addition to orienting the same. In either case, the support is arranged so that up and down motion of the berries ceases in the vicinity of the processing station whereby the desired operation will be performed on each berry while it moves substantially along a rectilinear path as defined by the trough.

The processing operation can consist of a single cut taken in the plane wherein the stem axis is positioned by the orienting method and will as a consequence provide for an accurate halving of the berries into two substantially identical half-sections.

Consequently, it will be appreciated that a method of halving strawberries has been provided which includes the methods of orienting, moving and cutting of the fruit as described, but it will also be appreciated that the methods of orienting, moving and cutting can be used individually or in combination with other food handling and processing methods. For example, the orienting method might advantageously be employed in connection with the packing of the berries or other fruit or vegetable.

The methods can be carried out in various manners, but in accordance with an additional aspect of the invention, several preferred apparatuses capable of performing the methods rapidly on large quantities of fruit are hereinafter described with reference to the accompanying drawings wherein:

FIG. 1 is a side elevational view of an apparatus embodying the present invention, FIG. 2 is a front elevational view of the apparatus, parts being broken away to illustrate interior details of construction, FIG. 3 is a sectional view taken substantially along line 3—3 of FIG. 2, FIG. 4 is an enlarged fragmentary exploded view in perspective of a portion of the apparatus, FIGS. 5 and 6 are enlarged fragmentary perspective views of other portions thereof, FIG. 7 is an enlarged fragmentary end view of a fruit or vegetable support and cutting arrangement, constituting a portion of the apparatus, FIG. 8 is a fragmentary side view thereof, FIG. 9 is a diagrammatic illustration of the movement of various elements of the apparatus, FIG. 10 is a fragmentary perspective view of a modified embodiment of the invention, FIG. 11 is a side view thereof, FIG. 12 is an enlarged fragmentary sectional view taken along line 12—12 of FIG. 11, and FIG. 13 is a fragmentary section similar to FIG. 12, illustrating a modified structure.

As shown best in FIGS. 1, 2, and 3, a preferred apparatus for carrying out the aforedescribed method includes a generally rectangular frame 20 consisting of tubular upright members 21 connected rigidly, as by welding, with cross members or braces 22.

A support for the strawberries generally indicated at 23 consists of a rectangular corrugated metal sheet 24 that is disposed on the upper portion of the frame 20 so that it declines slightly from the rear to the front of the apparatus, or from the left to the right as viewed in FIG. 3, and so that the V-shaped troughs 25 formed in the sheet 24 extend in longitudinal parallelism also from the rear to the front. For purposes to become apparent hereinafter, small metal strips 26 are secured in the bottom of the troughs 25 to terminate at a point somewhat shy of the forward or front end thereof and each trough 25 is centrally slotted as indicated at 27 at its forward end beyond the terminus of the described strips 26. At the rearmost end of the corrugated sheet 24, a flat plate 28 is secured to overlie or cover a small portion of the troughs. To add rigidity and enable support of the corrugated sheet 24, rigid braces 29 are welded or otherwise secured to its edges in encompassing relation.

The described support 23 for the strawberries is itself mounted on the frame 20 for reciprocatory movement. More specifically, the forward end of the support 23 is mounted for reciprocation that is substantially rectilinear while the rear end is arranged for reciprocation in the same general direction but arcuately.

To enable the rectilinear motion of the front of the support 23, bifurcated arms 30 are welded to each of the side braces 29 to project forwardly therefrom and mount wheels 31 arranged to roll forwardly and backwardly on suitable tracks 32 attached to the frame 20. As best shown in FIGS. 2 and 4, the wheels 31 are rotatably supported at the opposite extremities of a bar 33 that passes between the bifurcations of the arms 30 and is attached to small brackets 34 which are bolted to the arms 30. A plurality of bolt-receiving holes 35 are provided in the arms 30 so that the position of the bar 33 and the wheels 31 thereon can be adjusted more or less forwardly of the berry support 23.

The mentioned tracks 32 consist of short sections of angle iron placed in inverted position on mounting brackets 36 bolted to plates 37 attached to opposite sides of the frame 20. A plurality of apertures or holes 38 are provided in each plate 37 so that the position of the tracks 32 can be adjusted commensurately with an adjustment of the position of the wheels 31, as previously described. Additionally, to provide for angular adjustment of the track 32, each mounting bracket 36 has an arcuate slot 39 through which the bolted connection to the apertured plate is made. To keep the wheels 31 from jumping the tracks 32 during movement, a metal guide 40 is welded to each bracket 36 so as to engage the top of a roller 40a mounted on the exterior side of the rolling wheel and thus preclude upward movement thereof.

To provide for the aforementioned arcuate reciprocation of the rear end of the support 23, the opposite side braces 29 are pivotally connected to rigid straps 41 adjacent their lower ends. As best shown in FIG. 5 the upper end of each strap 41 is pivotally suspended from an ear 42 rigidly attached to the frame 20. Several holes 43 are provided in the ear 42 so that the pivotal axis about which the strap 41 swings can be adjusted. By such adjustment of the pivotal axis of the strap 41, the reciprocatory arc through which the rear end of the support can move is made variable. The straps 41 extend below the level of the support 23 and are connected at their extremities by a bar 44 so that substantial parallelism of the straps is maintained and rubbing against the side braces 29 of the support 23 is precluded.

Reciprocatory movement is imparted to the support 23 from an electric motor 45 through an eccentric, generally indicated at 46. The motor 45 is mounted under the described berry support 23 at one side of the frame 20 and drives by means of a suitable belt 47 a large pulley 48 secured on the outer end of a shaft 49 mounted in suitable bearings 50 so as to extend transversely of the frame 20 beyond the rear end thereof. The inner end of the transversely extending shaft 49 supports a disc 51 approximately at the longitudinal center line of the apparatus and this disc mounts a pin 52 eccentrically, as best shown in FIG. 6. One end of an eccentric arm 53 is rotatably secured on the pin 52 and its other end is pivotally connected, as indicated at 54, to the described support 23.

When the motor 45 is energized, the shaft 49 is caused to rotate and such rotation is converted to reciprocatory motion by the described eccentric. As can best be visualized by reference to FIG. 8, the rear end of the support 23 is reciprocated by the eccentric 46 along an arcuate course so as to shift both vertically and horizontally between predetermined limits as indicated by the full line and dotted line showings in FIG. 8. The front end of the support 23 reciprocates primarily in a horizontal direction, very little vertical shifting being encountered because of its mounting on the described wheels 31 for substantially rectilinear movement.

Above the forward end of the described strawberry support 23 is a shaft 60 mounted in bearings 61 on top of opposite sides of the frame 20 so as to extend transversely thereacross. A gang of circular cutting knives 62 are secured on the shaft 60 in spaced relation such that each knife 62 is arranged to enter slightly the central slot 27 formed at the forward end of a respective one of the described troughs 25, as can best be visualized by reference to FIGS. 7 and 9. The shaft 60 and attached knives 62 are driven from the described motor 45 by means of a suitable belt 63 and pulley (not shown) so that rotation of the knives is counterclockwise as viewed in FIGS. 3, 8, and 9, and as indicated by the arrow in each FIG. 8 and FIG. 9.

Preferably, a metal cover 65 is arranged over the belts 47, 63 and pulleys 48 at the side of the frame 20 and a large cover 66 is seated on top of the frame 20 to encompass the cutting knives 62 and the major portion of the berry support 23. Thus, protection against injury is afforded the attendant for the apparatus; and berries halved by the knives 62 are confined under said cover.

Beyond the rear of the top cover 66, a feed chute 70 is provided to supply strawberries to the rear end of the support 23. As shown best in FIG. 3, the chute 70 includes a plate 71 that declines to a point above the transverse plate 28 over the rear of the corrugated sheet 24 so as to conduct berries deposited thereon by hand or from a conveyor belt downwardly onto the plate 28. Side walls 72 and a baffle plate 73 complete the chute 70 and in combination provide a relatively gentle passage for the berries onto the support 23. A series of nozzles 74 spray water onto the feeding berries, such nozzles being fed from a suitable water supply (not shown) through a manifold 75.

If it is assumed that the motor 45 has been energized and water is being sprayed from the nozzles 74, strawberries supplied to the feed chute 70 will be moistened as they pass on to the plate 28 at the rear end of the support 23. Such moistening lubricates the berries and they will slide quite freely from the plate 28 into the troughs 25 as a result of the reciprocatory motion of the declining support 23. Lateral distribution of the berries occurs on the plate 28 so that each trough 25 will be supplied with fruit. As each berry slides along a given trough 25, the same reciprocatory motion that causes its movement also vibrates the berry and it tends to settle in said trough with its stem axis in the vertical plane that bisects the trough and in most instances with such axis pointing along the direction of motion or longitudinally of the trough 25. The described metal strips 26 which extend lengthwise of the troughs enhance the tumbling of the berries and assist in the orientation of those few berries whose shapes are regular so that the fruit has a section approaching an equilateral triangle or a sphere. Once orientation of the axis of the fruit into a vertical plane and longitudinally of the troughs 25 has been attained, virtually no tendency exists for them to reassume an unoriented disposition. Consequently, the length of the strips 26 need not be as great as depicted in the drawings.

The amount of vibration decreases as the berry approaches the cutting knives 62 for at its forward end, the support has negligible up and down motion. As a consequence, the oriented berry is presented to a respective one of the cutting knives 62 after it has attained a relatively quiescent state. Since the berry is oriented in the V-shaped trough and is relatively non-vibratory it will be halved quite accurately by the centrally disposed knife 62. As it is being halved, the knife 62 draws the berry off the support 23 and the halves can therefore drop downwardly for collection in a box or on a conveyor belt (not shown) for movement to a further processing station. The water drops through the described slots 27 and is directed by a baffle plate 78 for suitable collection separate from the halved berries.

The speed of the knives is not critical but it should be maintained above a level where insufficient centrifugal force is imparted to the berry halves to disengage them from frictional clinging to the knife blades. Similarly, while the speed of reciprocation of the support 23 is not critical, it must be sufficient to afford a relatively rapid flow of berries, and adequate vibration to orient the fruit. It will be appreciated that the character of the vibration can be altered by adjustment of the mounting of either or both ends of the support 23 in the manner described in detail hereinbefore. More particularly, the amount of vertical displacement of the support 23 and thus the amount of berry vibration can be altered by such adjustments.

Typical operation of the illustrated apparatus would provide a knife velocity of approximately 1600 revolutions per minute and a reciprocation of 570 oscillations per minute with a reciprocatory stroke of approximately ⅞ inch. Such operation renders the apparatus capable of processing 1500 pounds of berries per hour but it will be readily appreciated that similar devices can be constructed for greater or lesser capacity, as desired.

A somewhat modified apparatus wherewith the described method can be carried out is illustrated in FIGS. 10, 11 and 12 in a relatively diagrammatic fashion. A supporting frame and drive motor are not illustrated but it will be apparent that these and other elements can be connected much in the same manner as shown and described with respect to the first embodiment of the invention.

As shown, the apparatus includes a suitable feed chute 80 into which the strawberries or other fruit or vegetable can be deposited. The berries fall from said chute onto a declining corrugated plate 81 having longitudinally extending troughs 82 wherefore they slide downwardly forming themselves into rows. If the declination of this plate 81 is relatively great no vibration will be required to advance the fruit. The plate 81 terminates adjacent one of a pair of horizontally-spaced drums 84, 85 over which a plurality of continuous V-belts 86 are placed in spaced parallel relation. Each trough 82 terminates above and in alignment with the center of the space between adjacent belts 86 so that the berries are deposited in this space when they leave the trough.

As shown in FIG. 12, the drums 84, 85 are provided with suitable recesses 87 so that the belts 86 are supported thereon with their apexes directed outwardly so that a V-shaped support is formed between adjacent belts. The spacing between adjacent belts 86 is such that the berry is supported therebetween and moves therewith in the direction indicated by the arrow in FIG. 11 when the belt-supporting drums 84, 85 are driven by a suitable motor (not shown).

The spacing between the drums 84 and 85 is sufficiently great to provide for vibration of the belt sections lying intermediately of the two drums. The amount of vibration must be sufficient to produce vibration of the fruit carried on the belts 86 so that the fruit will orient itself much in the same fashion as described in connection with the first apparatus. The precise amount of vibration and thus the spacing between the drums 84, 85 will of course vary in accordance with the fruit being handled but a spacing of from 4 to 6 feet has been found preferable to accomplish the orienting of strawberries.

In the event that the inherent vibration of the belts 86 is not sufficient to produce orientation of the fruit, auxiliary means for imparting up and down vibration to the belts can be provided. As shown in FIGS. 10 and 11, such means takes the form of a double cam 90 mounted for rotation with a suitable shaft extending transversely under the belts 86 adjacent the feed plate 81.

Above the drum 85 are rotatably supported a number of circular cutting knives 88, these being mounted in spaced parallel relation such that their peripheries pass through small recesses 89 in the drum 85 that are disposed centrally of adjacent belts 86. Thus, the oriented berries are halved as they pass over the second drum 85 on the described supporting belts 86 and are thereafter discharged into a container or a conveyor (not shown). A cover (not shown) and other elements as mentioned and as described with respect to the first embodiment of the invention can be incorporated as will be apparent to those skilled in the art.

A further modification is illustrated in FIG. 13 where the individual belts 86 shown in FIGS. 10, 11 and 12 are replaced by a single continuous belt formed to provide a series of berry supporting troughs. As shown a cylindrical drum 85a supports this belt which includes ribs 86a of generally triangular cross-section connected by flat sections 26a which act in the manner of the strips 26 of the first embodiment to enhance the tumbling and orientation of the fruit. Slots 89a in the belt allow for reception of the knives 88 to assure complete severance of the fruit.

Various other modifications and alterations of the method and the apparatus will also readily occur to those skilled in the art so that the foregoing description is to be considered purely as exemplary and not in a limiting sense; the scope of the invention being indicated by the appended claims.

What is claimed is:

1. An arrangement for halving fruit or vegetables which comprises a sheet corrugated to form a plurality of parallel V-shaped troughs, means supporting said sheet for reciprocation with said troughs disposed in longitudinally inclined positions, means for reciprocating said sheet whereby fruit or vegetables will be moved along said troughs, each of said troughs having a central slot in the lower end thereof, and means including a single power operated knife supported above each of said troughs and having a cutting portion extending through the slot therein, and a rigid strip disposed flatly in each of said troughs to extend for a major portion of the length of said trough.

2. An arrangement according to claim 1 comprising a feed chute adapted to supply fruit or vegetables onto said sheet.

3. An arrangement according to claim 2 comprising means for spraying water onto the fruit or vegetables as they pass through said chute onto said sheet.

4. A device for orienting and halving strawberries comprising: a generally V-shaped trough conveyor; means operatively associated with said trough for causing reciprocation thereof whereby the strawberries are oriented; and a single power operated rotary knife blade disposed adjacent the discharge end of said trough, said rotary knife blade being in the vertical bisecting plane of said trough, with the axis of said rotary knife blade being disposed above the vertex of the V at a height thereabove sufficient to enable strawberries in said trough to pass beneath said axis, said rotary knife blade having a cutting portion extending downwardly into said trough at least to a point adjacent the vertex of the V whereby a strawberry in said trough may be completely halved by said single rotary knife blade.

5. A device as set forth in claim 4 wherein said means operatively associated with said trough for causing reciprocation thereof also moves said trough up and down through an amplitude that increases in direct proportion to the distance from said rotary knife blade.

References Cited in the file of this patent

UNITED STATES PATENTS

| | | |
|---|---|---|
| 457,940 | Stevenson | Aug. 18, 1891 |
| 554,037 | Shelley | Feb. 4, 1896 |
| 981,130 | Smyth | Jan. 10, 1911 |
| 1,747,461 | Vaughan | Feb. 18, 1930 |
| 1,876,051 | Gardner | Sept. 6, 1932 |
| 2,100,455 | Souther et al. | Nov. 30, 1937 |
| 2,103,383 | Russell | Dec. 28, 1937 |
| 2,350,586 | Carroll | June 6, 1944 |
| 2,540,020 | Waters | Jan. 30, 1951 |
| 2,568,947 | Carroll | Sept. 25, 1951 |
| 2,601,411 | McLaughlin | June 24, 1952 |
| 2,603,331 | Coons | July 15, 1952 |
| 2,698,037 | Shaw | Dec. 28, 1954 |
| 2,735,465 | Kellogg | Feb. 21, 1956 |